(12) United States Patent
Kratmann et al.

(10) Patent No.: US 9,797,369 B2
(45) Date of Patent: Oct. 24, 2017

(54) SEGMENTED ROTOR BLADE WITH A BOLT CONNECTION

(71) Applicant: Siemens Aktiengesellschaft, Munich (DE)

(72) Inventors: Kasper Koops Kratmann, Horsens (DK); Karsten Schibsbye, Fredericia (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 304 days.

(21) Appl. No.: 14/679,086

(22) Filed: Apr. 6, 2015

(65) Prior Publication Data
US 2015/0292477 A1 Oct. 15, 2015

(30) Foreign Application Priority Data

Apr. 11, 2014 (EP) .................................... 14164420

(51) Int. Cl.
*F03D 1/00* (2006.01)
*F03D 1/06* (2006.01)

(52) U.S. Cl.
CPC ......... *F03D 1/0633* (2013.01); *F03D 1/0675* (2013.01); *F05B 2230/60* (2013.01);
(Continued)

(58) Field of Classification Search
CPC ................ F03D 1/0675; F05B 2230/60; F05B 2240/302; F05B 2250/311; F05B 2260/301; Y02E 10/721
See application file for complete search history.

(56) References Cited

U.S. PATENT DOCUMENTS 4,854,798 A * 8/1989 Snyder .................. F16B 31/043
254/29 A
5,842,263 A * 12/1998 Gosling ................ B23P 19/067
254/29 A
(Continued)

FOREIGN PATENT DOCUMENTS

EP 1815137 A1 8/2007
EP 1950414 A2 7/2008
(Continued)

OTHER PUBLICATIONS

EP Search Report dated Jun. 9, 2016, for EP application No. 14164420.3.

*Primary Examiner* — Ninh H Nguyen
(74) *Attorney, Agent, or Firm* — Beusse Wolter Sanks & Maire (57) ABSTRACT

A rotor blade of a wind turbine with a first rotor blade segment and a second rotor blade segment is provided. The rotor blade has a hollow space surrounded by a shell. The first rotor blade segment is connected with the second rotor blade segment by a bolt connection. The bolt connection has a first connection of the first rotor blade segment, a second connection of the second rotor blade segment, and a bolt establishing a bolted joint between the first connection and the second connection. At least the bolt is situated in the hollow space of the rotor blade. Furthermore, a method of connecting a first rotor blade segment of a rotor blade of a wind turbine and a second rotor blade segment of the rotor blade is provided.

19 Claims, 9 Drawing Sheets (52) U.S. Cl.
CPC ... *F05B 2240/302* (2013.01); *F05B 2260/301* (2013.01); *Y02E 10/721* (2013.01); *Y02P 70/523* (2015.11)

(56) References Cited

U.S. PATENT DOCUMENTS

| | | | | |
|---|---|---|---|---|
| 7,891,947 B2* | 2/2011 | Chen | ............... | F03D 1/0675 |
| | | | | 416/225 |
| 7,980,827 B2* | 7/2011 | Stiesdal | ............... | F03D 1/0675 |
| | | | | 29/889.71 |
| 7,997,874 B2* | 8/2011 | van der Bos | ......... | F03D 1/0675 |
| | | | | 416/223 R |
| 8,376,713 B2* | 2/2013 | Kawasetsu | ............ | F03D 1/0675 |
| | | | | 416/226 |
| 8,510,947 B2* | 8/2013 | Kirkpatrick | ............. | B23P 15/04 |
| | | | | 29/411 |
| 2009/0116962 A1* | 5/2009 | Pedersen | ............... | F03D 1/0675 |
| | | | | 416/31 |
| 2009/0116966 A1* | 5/2009 | Althoff | ................. | B29C 70/025 |
| | | | | 416/230 |
| 2010/0122442 A1 | 5/2010 | Kirkpatrick et al. | | |
| 2010/0143148 A1 | 6/2010 | Chen et al. | | |
| 2013/0318788 A1 | 12/2013 | Sanz Pascual | | |
| 2014/0178205 A1* | 6/2014 | Nanukuttan | ............ | B23P 11/00 |
| | | | | 416/241 R |

FOREIGN PATENT DOCUMENTS

| | | |
|---|---|---|
| EP | 2631478 A1 | 8/2013 |
| EP | 2647494 A1 | 10/2013 |
| WO | 2006056584 A1 | 6/2006 |
| WO | 2009135902 A2 | 11/2009 |

* cited by examiner

SEGMENTED ROTOR BLADE WITH A BOLT CONNECTION

CROSS REFERENCE TO RELATED APPLICATIONS

This application claims the benefit of European Application No. EP14164420 filed Apr. 11, 2014, incorporated by reference herein in its entirety.

FIELD OF INVENTION

The present invention relates to a rotor blade of a wind turbine with a first rotor blade segment and a second rotor blade segment. Both rotor blade segments are connected by a bolt connection. Furthermore, the invention relates to a method of connecting a first rotor blade segment of a rotor blade of a wind turbine and a second rotor blade segment of the rotor blade, wherein the method comprises the step of establishing a bolted connection between the two rotor blade segments.

BACKGROUND OF INVENTION

In recent years, wind turbines have become larger and larger, leading to rotor diameters which became larger and larger, too. Consequently, rotor blades of wind turbines have become larger and larger as well. A rotor blade of a wind turbine may nowadays easily exceed 50 meters. This leads to a challenge in the structural design of the rotor blades. Furthermore, this leads to a challenge of transportation of the rotor blades from the manufacturing site to the installation site of the wind turbine.

One way to cope with this challenge is the provision of a segmented rotor blade. A segmented rotor blade comprises at least two rotor blade segments. The rotor blade may for example be divided into two equally large rotor blade segments. The rotor blade may also be divided into a first rotor blade segment and a second rotor blade segment, wherein the first rotor blade segment is larger than the second rotor blade segment.

Another option is to provide a main part of the rotor blade as one single piece, but to provide a tip section of the rotor blade as a separate piece. This is particularly advantageous if the tip has a specific shape, for example if the tip section is bent away from the main plane of the rotor blade. Then, particularly, transportation of the rotor blade is facilitated by the separated tip section.

In the PCT application WO 2006/056584 A1 a method of assembling a first section of a windmill arm and a second section of a windmill arm is presented. The method comprises the provision of a connecting piece for connecting the two arm sections and the connection is performed by a bolt embedded into the laminated shell of the respective windmill arm section.

In the European Patent Application EP 2,647,494 A1 a wind turbine blade comprising at least two longitudinal modules is disclosed, wherein the longitudinal modules have joining elements which are embedded in a composite material of the longitudinal module.

In other words, in the state of the art two rotor blade segments are connected with each other by some sort of bolt connection which is at least partly embedded in the shell of the rotor blade. A drawback of this solution is that the thickness and the structure of the laminated shell wherein the bolt connection is embedded to have to be adjusted with the thickness, i.e. the diameter, of the bolt. This means that either the shell has to have a sufficiently large thickness, at least where the bolt connection is performed, and/or the diameter of the bolt has to be sufficiently small. According to the position where the connection of the two rotor blade segments is performed this may pose restrictions to the design of the rotor blade.

Thus, there exists an urgent need to provide a segmented rotor blade with a shell wherein the thickness of the shell is relatively thin at the position of the connection of the two rotor blade segments.

SUMMARY OF INVENTION

This objective is achieved by the independent claims. The dependent claims describe advantageous developments and modifications of the invention.

In accordance with the invention there is provided a rotor blade of a wind turbine with a first rotor blade segment and a second rotor blade segment. The rotor blade comprises a hollow space surrounded by a shell. The first rotor blade segment is connected with the second rotor blade segment by a bolt connection. The bolt connection comprises a first connection of the first rotor blade segment, a second connection of the second rotor blade segment, and a bolt establishing a bolted joint between the first connection and the second connection. At least the bolt is situated in the hollow space of the rotor blade.

A wind turbine refers to a device that can convert wind energy, i.e. kinetic energy from wind, into mechanical energy, which is subsequently used to generate electricity. A wind turbine is also denoted a wind power plant.

A wind turbine typically comprises a tower, a nacelle, a generator, a hub and one or more rotor blades. The nacelle accommodates the generator and is typically mounted on top of the tower. Advantageously, the nacelle is pivotably mounted to the tower such that the nacelle can be rotated about a yaw axis. The wind turbine furthermore comprises typically a rotor which is able to rotate about a rotor axis of rotation. The hub is a part of the rotor. The hub is connected to the nacelle via the main bearing.

In a pitch-regulated wind turbine the rotor blades are pivotably mounted to the hub via a pitch bearing. The pitch bearing allows the rotor blade to be rotated about a pitch axis, thus optimizing the regulation of the wind turbine with regard to the incoming wind.

According to the invention the rotor blade comprises at least two rotor blade segments. This does not exclude the possibility that the rotor blade comprises even more than two rotor blade segments.

The rotor blade comprises a shell which surrounds, in other words encompasses, a hollow space. Thus, the inside, i.e. the interior of the rotor blade is at least partly hollow.

Advantageously, the rotor blade is not completely hollow or void. It may for example comprise a spar giving structural strength to the rotor blade. Furthermore, the rotor blade may at least be partly filled with filling material at a tip section of the rotor blade and/or at a root section of the rotor blade.

It has to be understood that the shell may have openings and/or sections where it does not concretely delimit the hollow space inside the rotor blade. Thus, the notion that the shell surrounds the hollow space includes the possibility that the hollow space inside is at least partly opened towards the exterior.

In an assembled, finished state the two rotor blade segments are firmly interconnected with each other by the bolt connection. The bolt connection comprises at least one bolt which is establishing a bolted joint between the two rotor blade segments.

A bolt is a fastener or fixing member which is at least partly threaded.

The bolt connection may be realized by one bolt or by a plurality of similar, identical or different bolts.

The bolt is located inside the rotor blade, i.e. in the hollow space of the rotor blade. The connection may also be at least partly situated in the hollow space of the rotor blade.

An advantage of arranging the bolt in the hollow space is that the dimensions and the shape of the bolt can be designed and optimized independent of the material and the thickness of the shell. Compared to the state of the art where a bolt is integrated or embedded in the shell, this broadens the possibilities of applying such a bolt connection to a segmented rotor blade of a wind turbine.

If, in a first alternative, for example, the bolt connection is in the half of the rotor blade which comprises the root section of the rotor blade, the thickness of the shell may be relatively large; however, the loads acting on the bolt connection are large, too. Thus, the bolt may be required to have a relatively large diameter which may cause problems to embed in the shell at the position of the bolt connection. Thus, the shell is required to be particularly thickened in order to safely embed the bolt in the shell.

This drawback is overcome by placing the bolt in the hollow space of the rotor blade. The shell needs not to be specifically thickened and the bolt does not influence the stability of the shell in the section of the bolt connection as such. Thus a thinner shell is possible while still a stable and robust bolt connection is maintained.

This advantage is also valid if the bolt connection is at a span-wise position close to the tip section of the rotor blade. At the tip section, due to a relatively small length of the chord and a relatively small length of the depth of the profile of the rotor blade, the shell also comprises a relatively small thickness. An integration of a bolt within the shell is thus complicated and requires a redesign of the shell at least at the position around the bolt connection. By positioning the bolt inside the rotor blade, i.e. in the hollow space of the rotor blade, this issue is overcome.

Another advantage of placing the bolt in the hollow space is its good accessibility, both during initial interconnection of the two rotor blade segments as well as during maintenance. This applies to the case where for example after some years in operation a bolt needs to be exchanged.

In an advantageous embodiment of the invention, the hollow space comprises a spar and air. The bolt is situated in the air.

It is advantageous to place a spar in the hollow space in order to provide and ensure a high stability and a high fatigue limit of the rotor blade. The spar is referred to as the main structural element of the rotor blade which is designed to carry the loads applied to the rotor blade and the weight of the rotor blade itself. The spar typically runs substantially in span-wise direction, i.e. in direction from the root section to the tip section.

The hollow space is beneficially filled with a gaseous medium such as air. In other words, the hollow space is advantageously filled with oxygen. Further components in the filling of the hollow space are not excluded.

In another advantageous embodiment, the second rotor blade segment is a tip section of the rotor blade.

An advantage of applying the inventive bolt connection to a connection of a first rotor blade segment and a second rotor blade segment, wherein the second rotor blade segment is the tip section of the rotor blade, is that particularly for the tip section the shell is relatively thin due to an overall small dimension of the airfoil profile.

It is furthermore particularly advantageous to manufacture the tip section of the rotor blade separate from the remaining part of the rotor blade as transportation of the rotor blade is facilitated. The tip section may comprise a curved or bent part which is, firstly, delicate to handle during transportation and, secondly, which may require a larger clearance during transportation. Thus, it is advantageous to provide a segmented rotor blade with a bolt connection wherein one of the two rotor blade segments comprises the tip section.

In another advantageous embodiment, the thickness of the part of the shell comprised by the second rotor blade segment is smaller than 50 millimeters, in particular smaller than 30 millimeters, at the connection of the first rotor blade segment and the second rotor blade segment.

An advantage of a thin shell comprising a thickness smaller than 50 millimeters, in particular smaller than 30 millimeters, is its reduced weight. It is beneficial to design and construct the shell just as thick as it is necessary to sustain the loads applying on the rotor blade. As the bolt is not embedded in the shell but situated in the hollow space, a choice of a relatively thin shell even at the position of the connection of the first rotor blade segment and the second rotor blade segment is possible. Thus, it is no longer necessary to particularly thicken the shell at the connection of the two rotor blade segments.

In another advantageous embodiment, the shell comprises a laminated composite material, in particular comprising glass fibers.

A laminated material is a material where two or more material components are firmly connected with each other. Lamination may be performed at high pressure or high temperature. The use of a laminated material for the shell of the rotor blade has the advantage that it provides light weight and high structural strength at the same time. Furthermore, it is easily accessible and inexpensive.

In another advantageous embodiment, the first connection and/or the second connections comprise metal, in particular steel.

An advantage of fabricating the connection with metal, in particular steel, is its high structural strength and its durability. It is noted that a typical rotor blade is required to withstand harsh conditions for at least 20 or even 25 years.

In another advantageous embodiment, the first connection comprises a cylindrical first fixing element which is inserted in a first opening of the first rotor blade segment. Furthermore, the second connection comprises a cylindrical second fixing element, which is inserted in a second opening of the second rotor blade segment.

Thus, advantageously, the first rotor blade segment comprises at least one first opening. The first opening may be regarded as a hole in the shell of the first rotor blade segment. The first opening is used to insert the first fixing element. In a specific alternative, the first rotor blade segment comprises another opening opposite to the first opening, wherein the other opening also represents a hole in the shell of the first rotor blade segment. The first fixing element comprises a cylindrical shape. In particular, it comprises a shape of a circular cylinder. The first fixing element may be arranged such with regard to the remaining rotor blade that it is perpendicular to the span and perpendicular to the chord of the rotor blade. The second connection may comprise a shape and an orientation similar to the first connection. Likewise, the second connection, i.e. the second fixing element, is just inserted by one opening in the shell or the shell may comprise another opening in the second rotor blade segment, wherein the other opening is opposite to the second opening.

In another advantageous embodiment, the rotor blade comprises a first reinforcement element, in particular a first reinforcement plate, for reinforcing the first opening. Furthermore, it may comprise a second reinforcement element, in particular a second reinforcement plate, for reinforcing the second opening.

As considerable forces and loads are transferred to the connection, in particular the fixing elements, it is advantageous to reinforce the area around the first opening and the second opening, respectively. This reinforcement is advantageously performed by adding a reinforcement element inside the rotor blade adjacent to the inner surface of the shell. The reinforcement element may be connected with the inner surface of the shell by an adhesive and/or by a fixing element such as a screw or a bolt. If the rotor blade comprises another opening opposite to the first opening or the second opening, respectively, then it is advantageous to also insert a reinforcement element at this other opening.

An advantage of having a reinforcement plate is that forces and loads acting on the reinforcement element are distributed over a relatively large area.

In another advantageous embodiment, the bolt is fixed with at least one tightening nut to the first fixing element and/or the second fixing element.

The bolt may be fixed to the fixing element at only one end or at both ends. An advantage of using a tightening nut to fit the bolt to the fixing element is that the bolt only needs to be threaded in the area which is prepared to be in contact with the tightening nut. In other words, no threads are needed in a through-hole of the fixing element.

In another advantageous embodiment, the first fixing element and the second fixing element each comprises a through-hole for inserting the bolt.

The through-hole is adapted with regard to size, in particular with regard to the diameter, and regarding a possible thread to the bolt. If for example the fixing element comprises a circular cross section and the bolt comprises a circular cross section as well, then the through-hole advantageously comprises a circular cross section, too. Inserting the bolt through a through-hole of the fixing element is an advantageous way to connect and fix both parts together without having unlimited access to the bolt. This is for example the case if two segments of a rotor blade have to be connected with each other as at least one section may only be accessed with difficulties.

In another advantageous embodiment, at least one of the through-holes is at least partly threaded.

A thread of the through-hole can be combined with a tightening nut in order to ensure a particularly strong joint between the bolt and the fixing element. However, by the threaded through-hole a tightening nut is not necessarily required.

In another advantageous embodiment, the bolt connection is pre-tensioned.

An advantage of pre-tensioning the bolt connection is that a strong connection can be achieved which is able to withstand continuous loads over a long time span before the bolt connection has to be re-fastened.

In another advantageous embodiment, at least one bracket is inserted in a gap which is generated by pre-tensioning of the bolt connection.

A bracket is also referred to a spacer.

Pre-tensioning of the bolt connection may be performed by applying a hydraulic tool, e.g. a hydraulic pump, to one end of the bolt.

In a first alternative, the fixing element and/or the tightening nut is pulled by application of a pressure to the fixing element and/or the tightening nut. Thus, the bolt is extended in its longitudinal position. Consequently, a gap is created between the fixing element and a tightening nut, which initially had been brought into contact to the fixing element. While the pressure is maintained by the hydraulic tool one or more brackets are inserted in the gap. After positioning of the brackets the hydraulic pressure is decreased, resulting in a strong, pre-tensioned bolt connection.

In a second alternative, the fixing element and/or the tightening nut is compressed by application of a pressure to the fixing element and/or the tightening nut. Thus, the bolt is compressed in its longitudinal position.

Pre-tensioning and inserting of brackets is particularly beneficial in the case of a bolt connection between two rotor blade segments as large forces are necessary and a manual fixing of the bolt to the fixing elements is only possible with a large effort.

In another advantageous embodiment, the shell comprises at least one shell opening for fastening the bolt to the first fixing element and/or the second fixing element and/or for pre-tensioning bolt connection.

Shell openings are advantageous in order to access the bolt connection during establishing the bolt connection or during maintaining i.e. re-fastening the bolt connection. The shell openings may be designed as openings with a lid being part of the shell of the rotor blade.

In another advantageous embodiment, the first rotor blade segment and the second rotor blade segment are connected in a form-fitted manner, in particular by connection of a male end part and a female end part.

It is advantageous if the two rotor blade segments already comprise a form-fitted connection and that the bolt connection is a supplement and reinforcement to this form-fitted connection. If the second rotor blade segment is the tip section of the rotor blade, it may be beneficial if the second rotor blade segment comprises the male end part and the first rotor blade segment comprises the female end part. Such a configuration is also referred to as a collar-like construction.

Alternatively, also a full butt joint between the two rotor blade segments may be beneficial.

The full butt joint may be complemented by a guiding mechanism in order to represent a form-fitted connection.

The invention is also directed to a method of connecting a first rotor blade segment of a rotor blade of a wind turbine and a second rotor blade segment of the rotor blade, wherein the rotor blade comprises a hollow space surrounded by a shell. The method comprises the steps of providing both rotor blade segments, and establishing a bolted connection between a first connection of the first rotor blade segment and a second connection of the second rotor blade segment by a bolt, wherein the bolt is situated in the hollow space of the rotor blade.

An advantage of this method is that the shell and the bolt can be designed independently from each other. In particular the shell does not pose restrictions or limitations with regard to the size, in particular the diameter, of the bolt.

Another advantage is that by placing the bolt in the hollow space of the rotor blade instead, for instance, in the shell, the material of the shell is not influenced by the presence of the bolt. The shell may for example be made of a laminated composite material featuring a particular strength regarding loads acting on the shell. This structural strength may be reduced by an embedded bolt. By placing the bolt in the hollow space this reduction of strength of the composite material is prevented and the load that the shell can withstand also at the position of the bolt connection is increased.

The establishment of the bolted connection may be carried out at the manufacturing site of the rotor blade segments. It may, however, be particularly advantageous to transport the rotor blade segments separate from each other and connect them at the installation site of the wind turbine. Connection of the two rotor blade segments may for example be carried out before mounting the rotor blade to the hub or the first rotor blade segment may at first be mounted to the hub which itself is already connected to the nacelle and subsequently the second rotor blade segment is connected with the first rotor blade segment.

In another advantageous embodiment, the bolted connection comprises at least one tightening nut for fixing the bolt to the first connection and/or the second connection, and the establishment of the bolted connection comprises the further steps of tightening the tightening nut, positioning the bolted connection, in particular by an hydraulic tool, and inserting at least one bracket in a gap which is generated by pre-tensioning of the bolt connection.

As the bolted connection has to withstand considerable loads over a considerable time span, typically exceeding 20 or even 25 years of operation in harsh conditions, a tightened and strong connection between the tightening nut and the connection is advantageous. It is thus beneficial to elongate the bolt by for example a hydraulic tool and subsequently fill the generated gap by one or more brackets. Subsequently, the force applied to the bolt can be released and a tightened strong connection between the tightening nut and the connection results.

BRIEF DESCRIPTION OF THE DRAWINGS

Embodiments of the invention are now described, by way of example only, with reference to the accompanying drawings, of which.

DETAILED DESCRIPTION OF INVENTION

The illustration in the drawings is in schematic form. It is noted that in different figures, similar or identical elements may be provided with the same reference signs.

Figure 1:
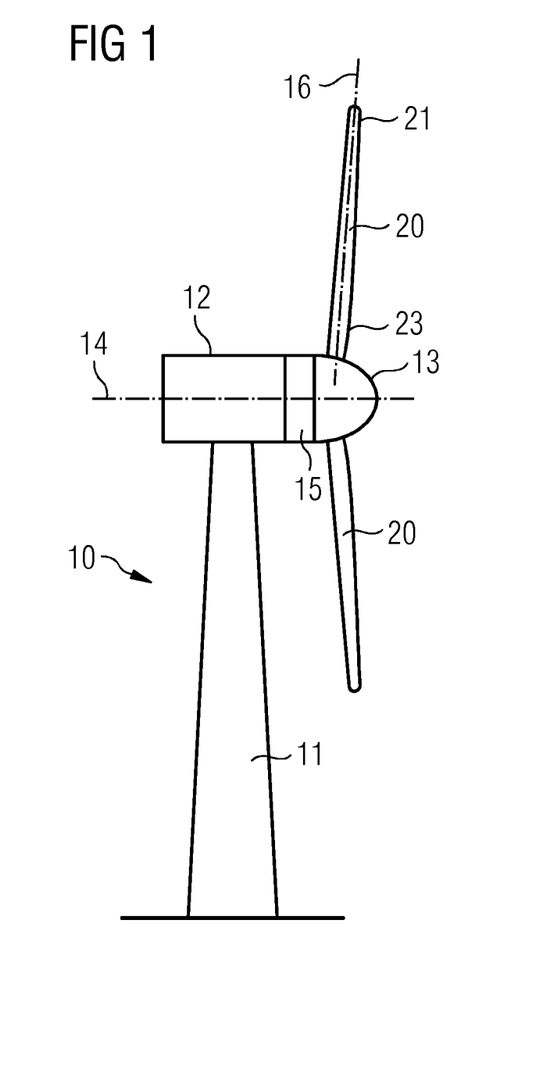
FIG. 1 shows a wind turbine.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by a yaw bearing. The axis of rotation of the nacelle 12 with regard to the tower 11 is referred to as the yaw axis.

The wind turbine 10 furthermore comprises a hub 13 with one or more rotor blades 20. The hub 13 is mounted rotatable with regard to the nacelle 12 by a main bearing. The hub 13 is mounted rotatable about a rotor axis of rotation 14.

The wind turbine 10 furthermore comprises a main shaft, which connects the hub 13 with a rotor of a generator 15. If the hub 13 is connected directly to the rotor, the wind turbine is referred to as a gearless, direct drive wind turbine. Alternatively, the hub 13 may also be connected to the rotor via a gearbox. This type of wind turbine is commonly referred to as a geared wind turbine.

The generator 15 is accommodated within the nacelle 12. The generator 44 comprises the rotor and a stator. The generator 15 is arranged and prepared for converting the rotational energy from the rotor into electrical energy.

In the concrete example of FIG. 1, the wind turbine 10 comprises three rotor blades 20 (of which two rotor blades 20 are depicted in FIG. 1). The rotor blades 20 are mounted rotatable with regard to the hub 13 by a pitch bearing. The rotor blades 20 may thus be pitched about a pitch axis 16 in order to optimize the orientation with regard to the wind flow impinging on the wind turbine 10. Each of the rotor blades 20 comprises a root section 23 and a tip section 21. The root section 23 refers to the section of the rotor blade 20 which is closest to the hub 13. The tip section 21 refers to the section of the rotor blade 20 which is furthest away from the hub 13, thus being opposite to the root section 23.

Figure 2:
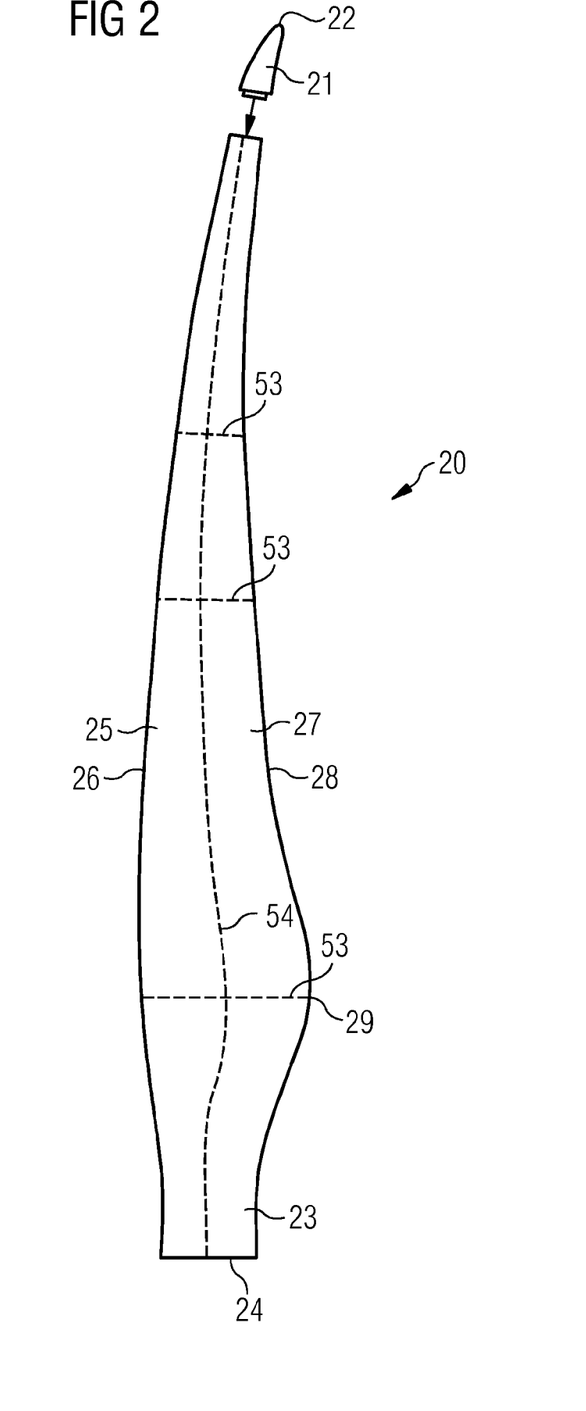
FIG. 2 shows a segmented rotor blade.

In FIG. 2, a rotor blade 20 in a top view, in other words a plane view is shown. The rotor blade 20 comprises a tip section 21 and a root section 23. The tip section 21 is referred to as the portion of the rotor blade 20 which is surrounding the tip 22 of the rotor blade 20. In particular, the volume of the tip section 21 comprises at the most a portion of 10% of the volume of the whole rotor blade 20. Likewise, the root section 23 is referred to as the portion of the rotor blade 20 which is surrounding the root 24 of the rotor blade 20. In particular, the volume of the root section 23 comprises at the most 10% of the volume of the whole rotor blade 20.

Furthermore, the rotor blade 20 comprises a leading edge section 25 with a leading edge 26, as well as a trailing edge section 27 with a trailing edge 28. Again, the leading edge section 25 is referred to as the portion of the rotor blade which is surrounding the leading edge 26. Likewise, a trailing edge section 27 is referred to as the portion of the rotor blade which is surrounding the trailing edge 28.

Furthermore, a chord 53 of the rotor blade 20 may be defined as a straight line between the leading edge 26 and a trailing edge 28 at each span-wise position of the rotor blade 20. The point of the trailing edge 28, where the respective chord 53 has a maximum length, is denoted as shoulder 29 of the rotor blade 20.

The span 54, which is also denoted as a center line of the rotor blade 20, extends from the tip section 21 to the root section 23. If the rotor blade is a straight rotor blade, the span 54 is a straight line. If, alternatively, as it is the case in the concrete example of FIG. 2, the rotor blade has a curved, i.e. a swept shape, the span 54 is curved and follows the shape of the rotor blade.

FIG. 2 shows a rotor blade 20 which comprises two rotor blade segments and is in a disassembled, in other words disconnected state. One rotor blades segment is represented by the tip section 21. The other rotor blade segment is represented by the remaining part of the rotor blade 20.

Figure 3:
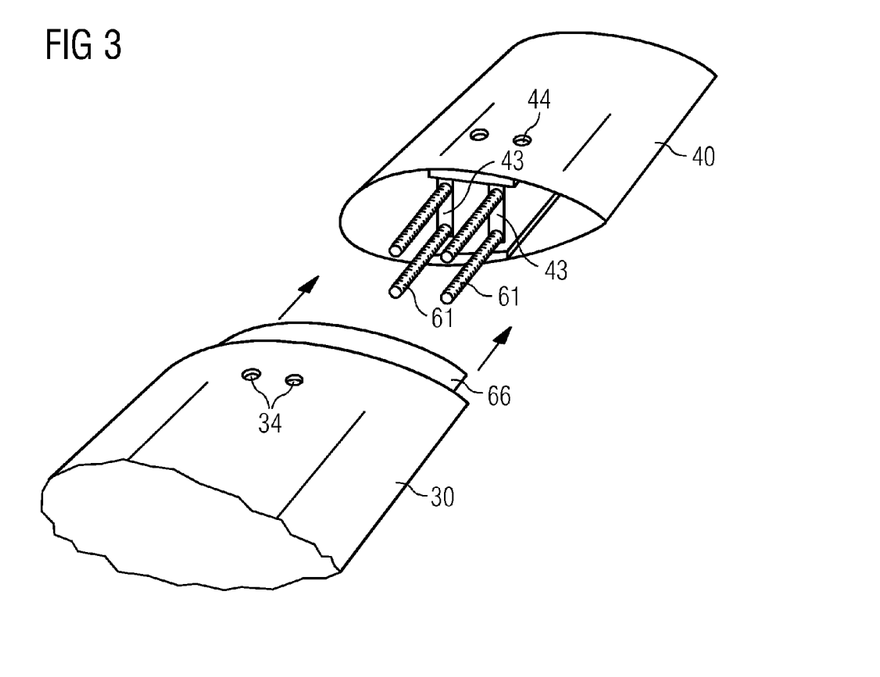
FIG. 3 shows two rotor blade segments arranged for being connected to each other.

In FIG. 3, a first rotor blade segment 30 and a second rotor blade segment 40 in a disconnected state is shown. The first rotor blade segment 30 comprises a male end part 66 which is arranged for being connecting to the second rotor blade segment 40 in a form fitted manner. The first rotor blade segment 30 comprises two first openings 34 in which first connection and brackets not shown are inserted. The second rotor blade segment 40 likewise comprises openings in its shell, namely two second openings 44. Second connection in the particular embodiment of a pair of second fixing elements 43 are inserted into the second openings 44. In each of the two second fixing elements 43 a pair of bolts 61 is inserted. These bolts 61 are fixed to the second connection. These bolts 61 are arranged and prepared for being connected to the first connection. All four bolts 61 shown in FIG. 3 are substantially parallel to each other. The bolts 61 are threaded along their entire length, respectively. The bolts 61 are made of steel. Thus, a strong and durable connection of the first rotor blade segment 30 and the second rotor blade segment 40 can be realized.

Figure 4:
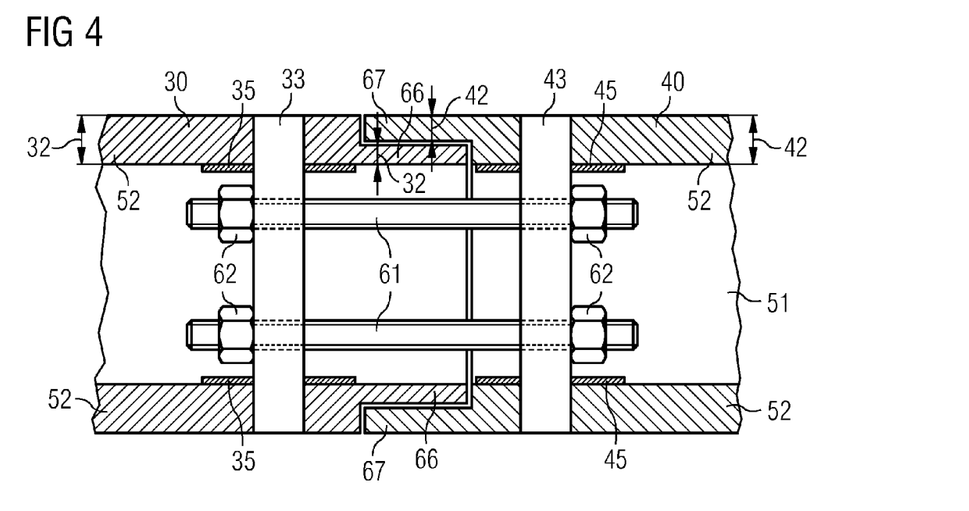
FIG. 4 shows a bolt connection with two bolts comprising two tightening nuts each.

FIG. 4 shows a first rotor blade segment 30 connected with a second rotor blade segment 40 in a connected state. Both rotor blade segments 30, 40 comprise a shell 52 made of a laminated composite material. The shell 52 comprises a substantially closed envelope of a hollow space 51 which is building the inside of the rotor blade. The shell 52 comprises a predetermined thickness. The thickness of the first shell 32 varies with regard to its span-wise position wherein it decreases at the region of the bolt connection and is relatively stable and equal in the remaining sections. Likewise the thickness of the second shell 42 is basically equal in the considered part of the second rotor blades segment 40, featuring a reduced thickness 42 at the bolt connection. The reduced thickness of the first shell 32 and the second shell 42 is due to the fact that the shells overlap at the bolt connection, leading to a male end part 66 of the first rotor blade segment 30 and a female end part 67 of the second rotor blade segment 40. Both rotor blade segments 30, 40 comprise openings in which a first fixing element 33 and a second fixing element 43 are inserted, respectively. The fixing elements 33, 43 have a shape of a circular cylinder. The shell 52 is reinforced in the vicinity of the openings by reinforcement plates, in particular by a first reinforcement element 35 in the first rotor blade segment 30 and a second reinforcement element 45 in the second rotor blade segment 40. The fixing elements 33, 43 comprise a through-hole (not shown) through which the two bolts 61 are conducted. The bolts 61 are both free threaded along their entire length and are fixed to the fixing elements 33, 34 by tightening nuts 62. The bolts 61 are fixed to the fixing elements 33, 43 at both ends with one tightening nut 62 each.

Figure 5:
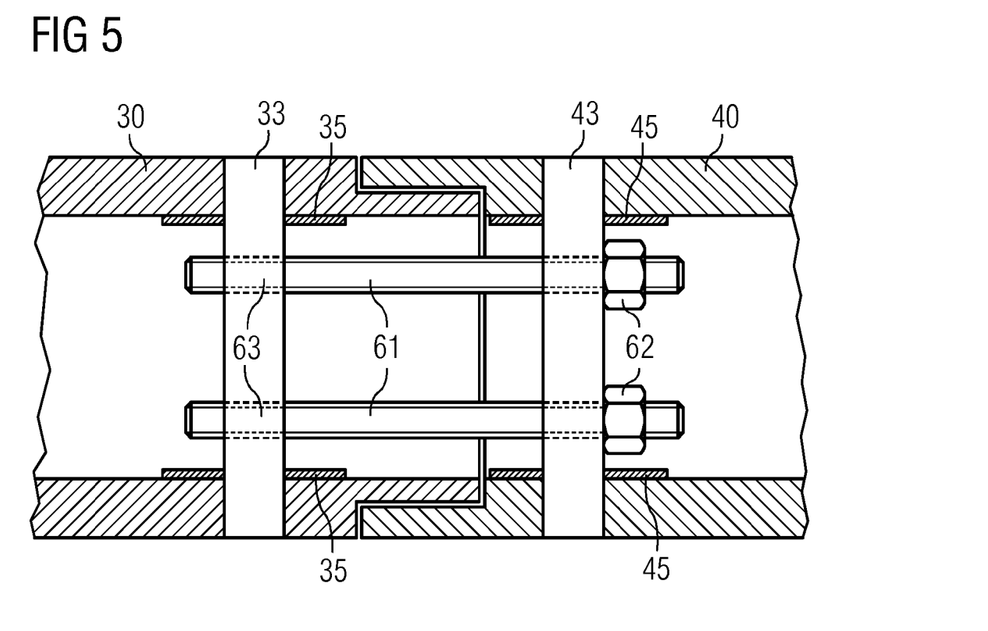
FIG. 5 shows a bolt connection with two bolts comprising one tightening nut each.

FIG. 5 shows a similar bolt connection as FIG. 4. Regarding identical or similar elements it will thus be referred to FIG. 4. FIG. 5 shows an alternative embodiment of a bolt connection as it shows threaded through holes 63 in the first fixing element 33. An advantage of this embodiment is that a second pair of tightening nuts 62 is not necessary and that establishment of the bolt connection can easy be performed by just conducting the bolts 61 through the through-holes 63 without having to tight tightening nuts. This is particularly advantageous if access to the hollow space in the first rotor blade segment 30 is difficult.

Figure 6:
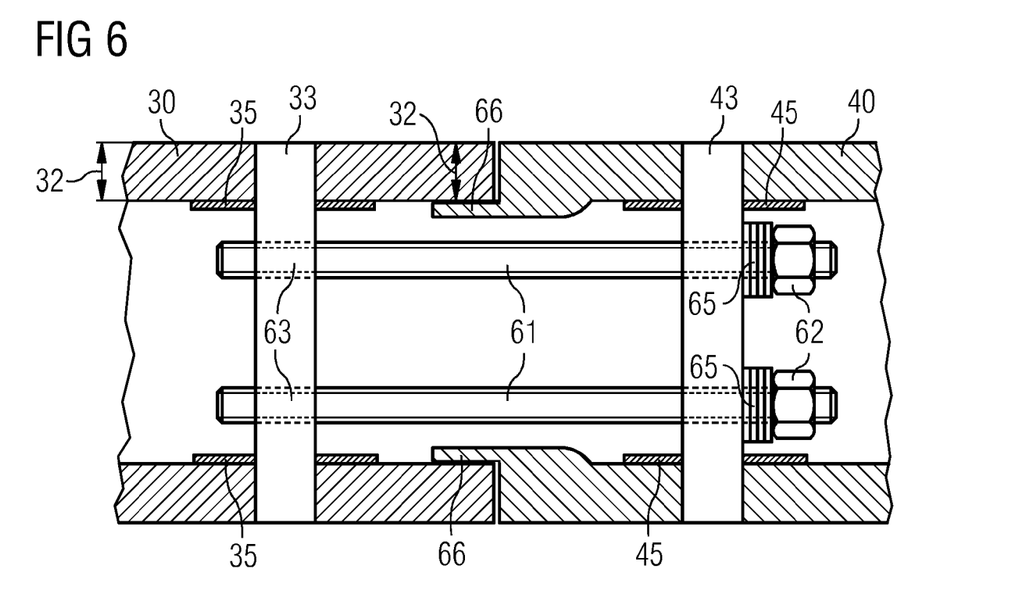
FIG. 6 shows a pre-tensioned bolt connection.

FIG. 6 shows yet another embodiment of a bolt connection between a first rotor blade segment 30 and a second rotor blade segment 40, featuring a different type of male end part and female end part and featuring a pre-tensioning of the bolt 61. Similar or identical features as already described in FIGS. 4 and 5 will not be repeated and thus it shall be referred to FIGS. 4 and 5 with regard to these features. FIG. 6 shows that the male end part 66 of the second rotor blade segment 40 is designed as an extension or thickening of the shell in the region of the bolt connection. One advantage is that the thickness of the first shell 32 remains equal in the whole area of the considered first rotor blade segment 30. The joint illustrated in FIG. 5 is also referred to as a full butt joint.

FIG. 6 also shows that the bolts 61 have been pre-tensioned after being conducted through the through-holes 63 of the first fixing elements 33 and that brackets 65 have been inserted in the gap being generated during pre-tensioning between the second fixing element 43 and the tightening nuts 62 adjacent to the second fixing element 43.

Note that the through-holes 63 of the first fixing element 33 are threaded, while the through-holes 63 of the second fixing element 42 are not threaded. Thus, pre-tensioning can effectively be carried out.

Figure 7A:
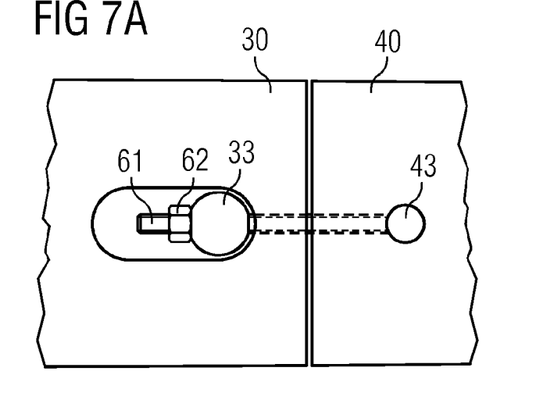
FIGS. 7A to 7C show a method of connecting two rotor blade segments with a pre-tensioned bolted connection.
Figure 7B:
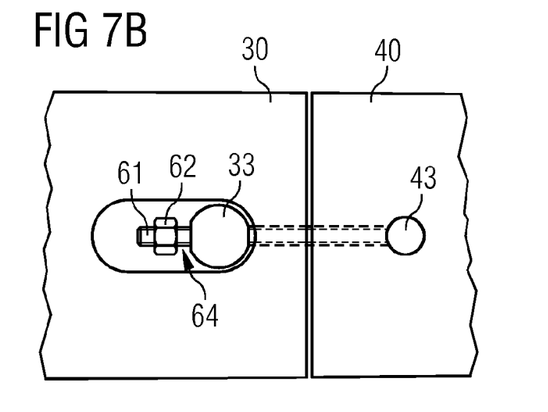
Figure 7C:
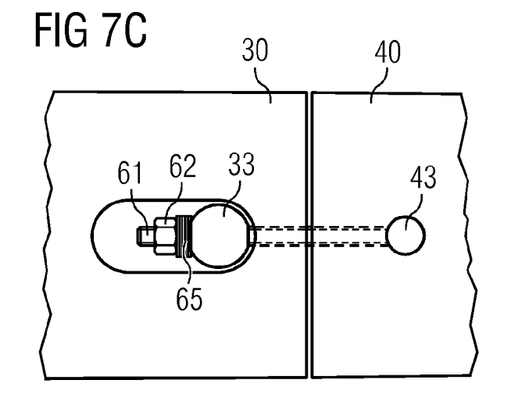

FIGS. 7A to 7C show a method of advantageously connecting a first rotor blade segment 30 with a second rotor blade segment 40. The first rotor blade segment 30 comprises a first fixing element 33 which has a circular cross-section in a top view. Likewise, the second rotor blade segment 40 comprises a second fixing element 43 with a circular cross-section in a top view, too. In a first step a bolt 61, which is threaded along its entire length, is conducted through a through-hole (not shown) of the first fixing element 33 and is tightened by a tightening nut 62. In a second step the bolt is fixed to the second fixing element 43. This can in principle be done by a mere threaded through-hole of the second fixing element 43 and/or by a second tightening nut (not shown). After the bolt 61 is firmly attached to both fixing elements 33, 43, in a third step the bolt 61 is elongated by using an hydraulic pump. Consequently, a gap 64 between the tightening nut 62 and the outer surface of the first fixing element 33 is generated. In a fourth step brackets 65 are inserted into the gap 64 while maintaining the pressure on the bolt 61. In a last step the pressure is released and the bolt 61, in particular the tightening nut 62, is firmly and strongly pressed towards the first fixing element 33. Thus, a strong and durable connection between the two rotor blade segments 30, 40 is realized.

Figure 8A:
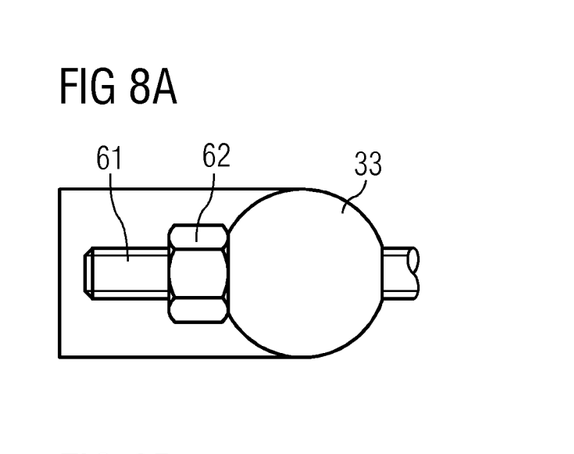
FIGS. 8A to 8C show the method of FIGS. 7A to 7C in a top view.
Figure 8B:
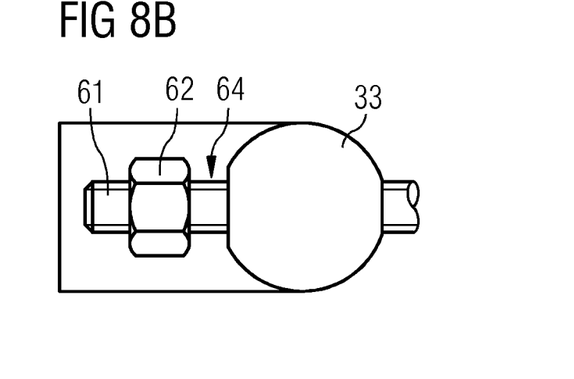
Figure 8C:
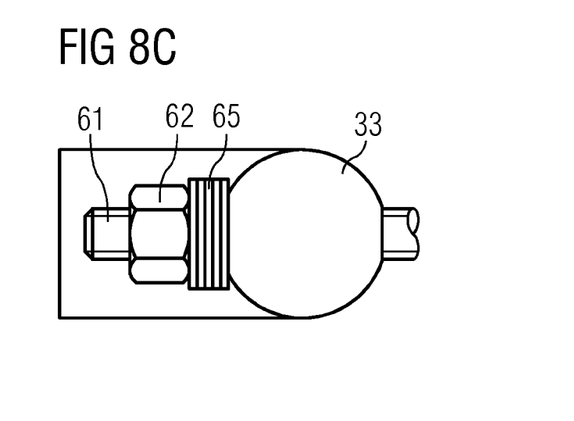

FIGS. 8A to 8C show the method of connecting the two rotor blade segments 30, 40 disclosed and illustrated in FIGS. 7A to 7C in more detail. In particular the first fixing element 33 and the adjacent tightening nut 62 are shown in a top view. It can be seen that by providing a leveled or flattened side of the first fixing element 33 a good and durable contact between the tightening nut 62 and the first fixing element 33 via the plurality of brackets 65 is realized.

Figure 9A:
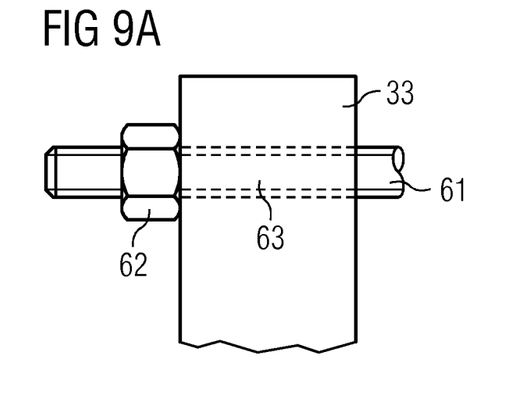
FIGS. 9A to 9C show the method of FIGS. 7A to 7C in a side view.
Figure 9B:
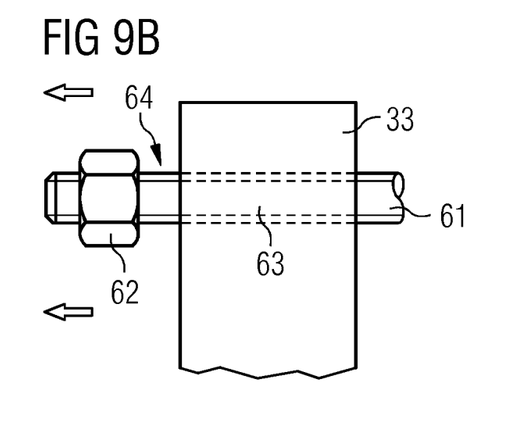
Figure 9C:
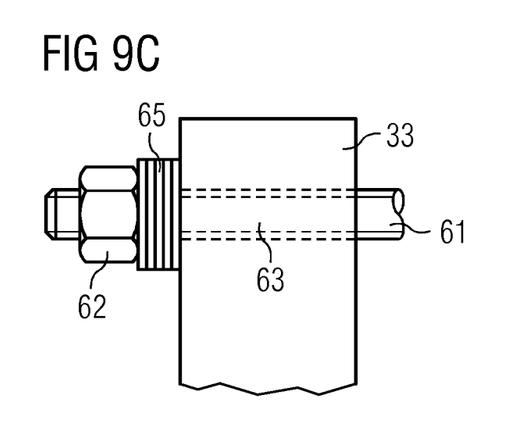

The same method as presented in FIGS. 7A to 7C and FIGS. 8A to 8C is illustrated in FIGS. 9A to 9C in a side view. Again it can be seen that firstly the tightening nut 62 is positioned in direct contact to the surface of the first fixing element 33, subsequently the bolt 61 is elongated and finally by introducing brackets 65 into the generated gap 64 and releasing the pressure a stable and durable joint can be realized.

Figure 10:
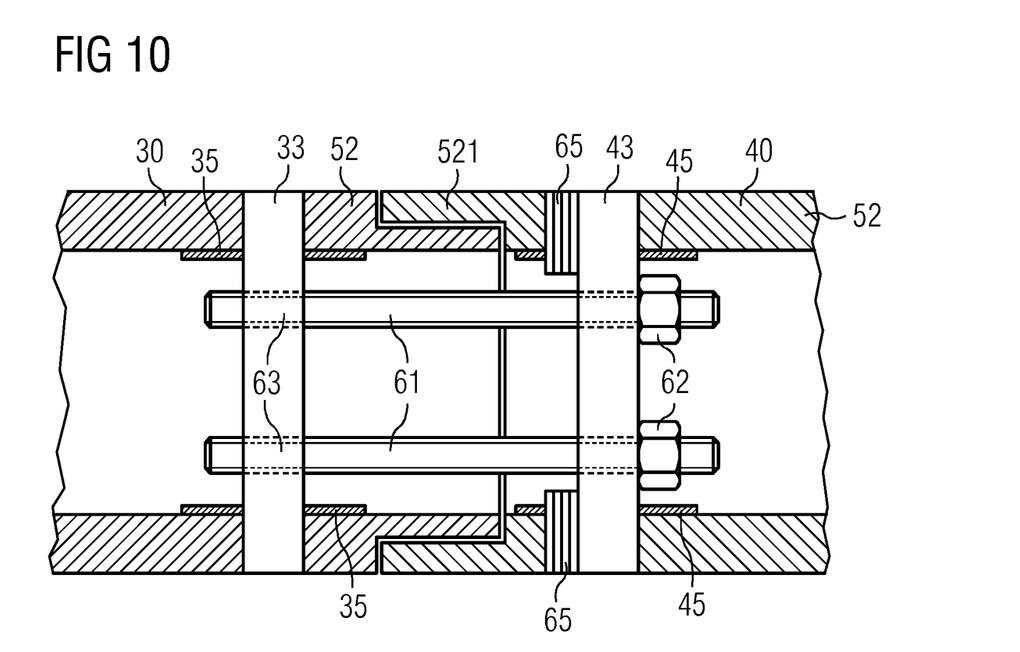
FIG. 10 shows another embodiment of a pre-tensioned bolt connection.

FIG. 10 shows another embodiment of a pre-tensioned bolt connection. In this embodiment, the second fixing element 43 has been pulled away from the first fixing element 33 during pre-tension of the bolt connection. Thus, a gap between the second fixing element 43 and a part of the shell 521 is generated. Subsequently, brackets 65 are inserted into this gap. Finally, the pulling force is released, resulting in a pre-tensioned bolt connection.

Figure 11A:
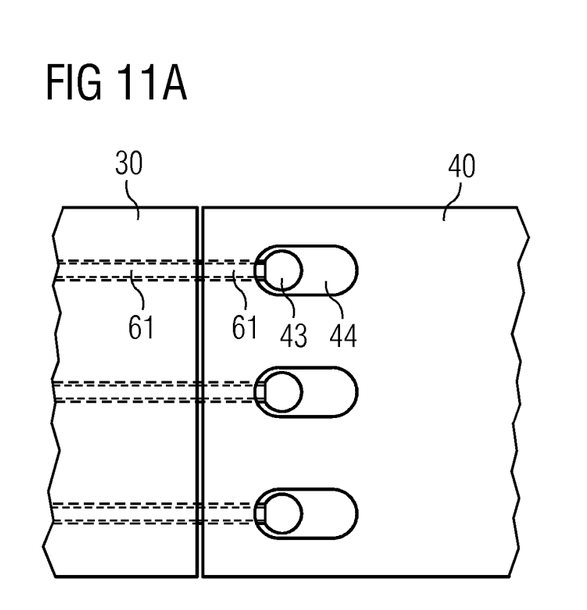
FIGS. 11A and 11B shows the bolt connection of FIG. 10 in a relaxed state and a pre-tensioned state, respectively.
Figure 11B:
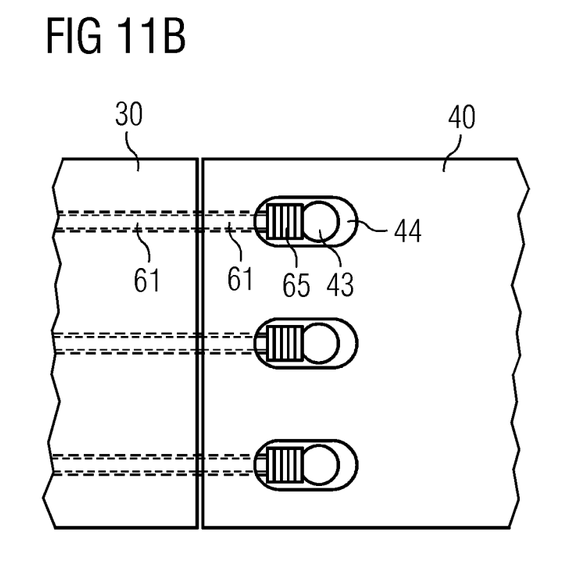

FIGS. 11A and 11B show a top view of the bolt connection of FIG. 10 in two different states. It can be seen that the second opening 44 has an oval shape in the top view. It can furthermore be seen that the bolt connection comprises three second openings 44, three second fixing elements 43 and three bolts 61.

FIG. 11A shows the bolt connection in a relaxed state, i.e. without pre-tension. The second fixing element 43, which is substantially cylindrical except for a flat surface portion directed towards the first rotor blade segment 30, is relatively close to the side of the second opening 44, which is directed towards the first rotor blade segment 30.

Subsequently, the second fixing element 43 is pulled away from the first rotor blade segment 30 and the distance between the side of the second opening 44, which is directed towards the first rotor blade segment 30, and flat second fixing element 43 increases. In other word, a gap is created (not shown).

Subsequently, brackets 65 are inserted in the in the created gap, as can be seen in FIG. 11B. Upon release of the pulling force, a pre-tensioned bolt connection results.

The invention claimed is:

1. A rotor blade of a wind turbine with a first rotor blade segment and a second rotor blade segment, the rotor blade comprising
   a hollow space surrounded by a shell,
   wherein the first rotor blade segment is connected with the second rotor blade segment by a bolt connection,
   wherein the bolt connection comprises a first connection of the first rotor blade segment, a second connection of the second rotor blade segment, and a bolt establishing a bolted joint between the first connection and the second connection, and
   wherein at least the bolt is situated in the hollow space of the rotor blade,
   wherein the first connection comprises a cylindrical first fixing element inserted in a first opening of the first rotor blade segment,
   wherein the second connection comprises a cylindrical second fixing element inserted in a second opening of the second rotor blade segment, and
   wherein the bolt is fixed with at least one tightening nut to the first and/or second fixing element.

2. The rotor blade according to claim 1,
   wherein the hollow space comprises a spar and air, and the bolt is situated in the air.

3. The rotor blade according to claim 1,
   wherein the second rotor blade segment is a tip section of the rotor blade.

4. The rotor blade according to claim 1,
   wherein a thickness of the shell of the second rotor blade segment is smaller than 50 millimeters at the bolt connection of the first rotor blade segment and the second rotor blade segment.

5. The rotor blade according to claim 4,
   wherein a thickness of the shell of the second rotor blade segment is smaller than 30 millimeters at the bolted connection of the first rotor blade segment and the second rotor blade segment.

6. The rotor blade according to claim 1,
   wherein the shell comprises a laminated composite material comprising glass fibers.

7. The rotor blade according to claim 1,
   wherein the rotor blade comprises a first reinforcement element for reinforcing the first opening and/or a second reinforcement element for reinforcing the second opening.

8. The rotor blade according to claim 7,
   wherein the rotor blade comprises the second reinforcement element for reinforcing the second opening.

9. The rotor blade according to claim 1,
   wherein the first fixing element and the second fixing element each comprise a through-hole for inserting the bolt.

10. The rotor blade according to claim 1,
    wherein the bolt connection is pre-tensioned.

11. The rotor blade according to claim 1,
    wherein at least one bracket is inserted in a gap which is generated by pre-tensioning of the bolt connection.

12. The rotor blade according to claim 1,
    wherein the shell comprises at least one shell opening for fastening the bolt to the first fixing element and/or the second fixing element and/or for pre-tensioning the bolt connection.

13. The rotor blade according to claim 1,
    wherein the first rotor blade segment and the second rotor blade segment are connected in a form-fitted manner.

14. The rotor blade according to claim 13,
    wherein the first rotor blade segment and the second rotor blade segment are connected in a form-fitted manner by connection of a male end part and a female end part.

15. A method of connecting a first rotor blade segment of a rotor blade of a wind turbine and a second rotor blade segment of the rotor blade, wherein the rotor blade comprises a hollow space surrounded by a shell, the method comprising
    providing both rotor blade segments, and
    establishing a bolted connection between a first connection of the first rotor blade segment and a second connection of the second rotor blade segment by a bolt, wherein the bolt is situated in the hollow space of the rotor blade,
    wherein the first connection comprises a cylindrical first fixing element inserted in a first opening of the first rotor blade segment,
    wherein the second connection comprises a cylindrical second fixing element inserted in a second opening of the second rotor blade segment, and
    wherein the bolt is fixed with at least one tightening nut to the first and/or second fixing element.

16. The method according to claim 15,
    wherein the establishment of the bolted connection further comprises:
    tightening the tightening nut,
    pre-tensioning the bolted connection, and
    inserting at least one bracket in a gap which is generated by pre-tensioning of the bolted connection.

17. The method according to claim 16,
    wherein pre-tensioning the bolted connection is accomplished via an hydraulic tool.

18. A rotor blade of a wind turbine comprising:
    a shell comprising a first rotor blade segment and a second rotor blade segment, a first fixing element disposed in a hollow space defined by the first rotor blade segment and connected to a pressure side and to a suction side of the first rotor blade segment,
    a first reinforcement element disposed on an inner surface of the first rotor blade segment and configured to distribute a load between the first fixing element and the first rotor blade segment,
    a second fixing element disposed in a hollow space of the second rotor blade segment and connected to a pressure side and to a suction side of the second rotor blade segment, a second reinforcing element disposed on an inner surface of the second rotor blade segment and configured to distribute a load between the second fixing element and the second rotor blade segment, and a bolt configured to establish a bolted joint between the first fixing element and the second fixing element, wherein the bolt is disposed between the pressure side and the suction side of at least one of the first and second rotor blade sections; wherein the first reinforcement element comprising a first plate through which the first fixing element is disposed, and the second reinforcement element comprising a second plate through which the second fixing element is disposed.

19. The rotor blade of a wind turbine of claim 18, the first reinforcement element comprising a first plate through which the first fixing element is disposed, and the second reinforcement element comprising a second plate through which the second fixing element is disposed.

* * * * *